Oct. 2, 1951 H. A. HAMBERGER 2,570,118
AUTOMATIC GRINDER FOR SMALL CIRCULAR SAWS
Filed Dec. 14, 1948 3 Sheets-Sheet 3
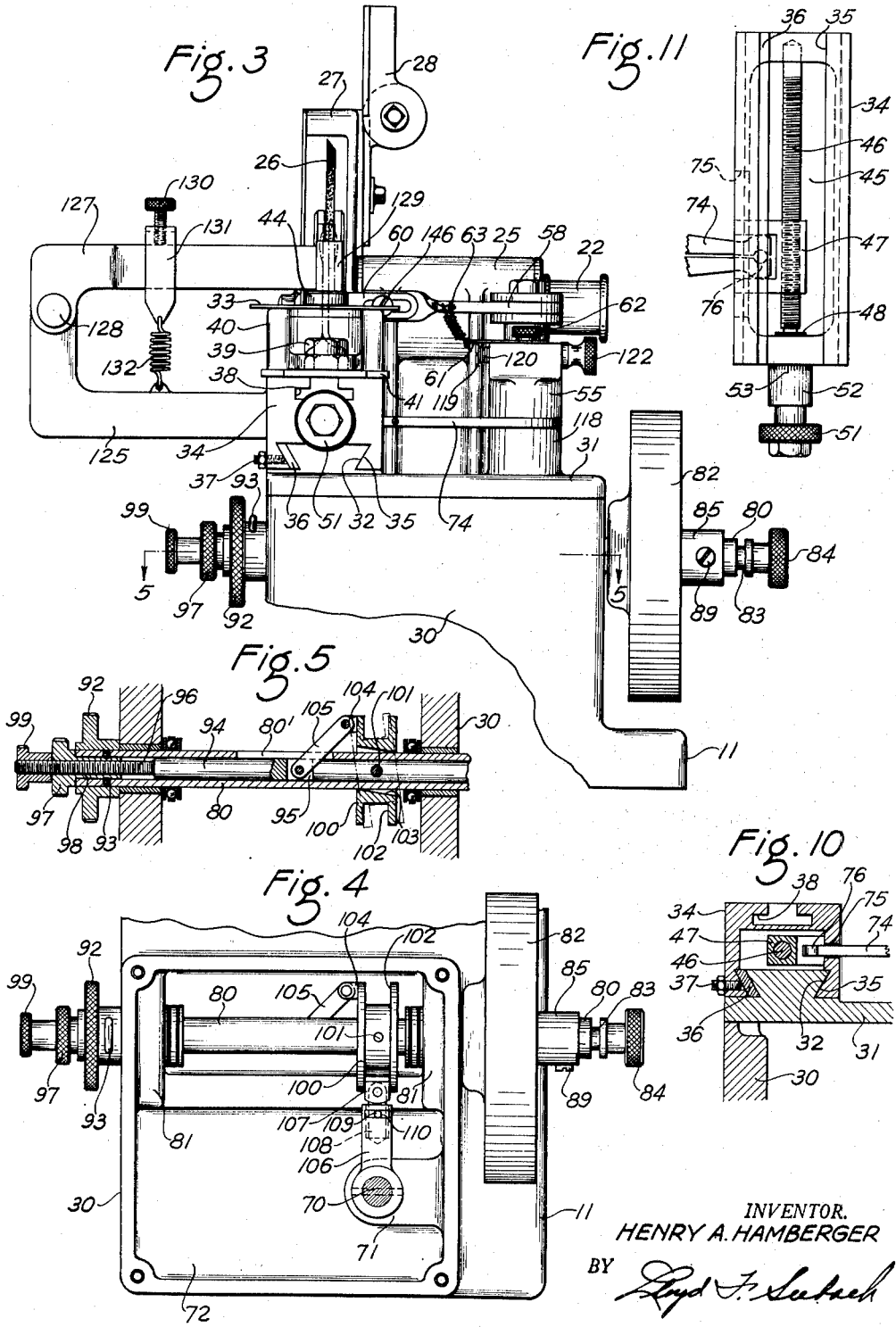
INVENTOR.
HENRY A. HAMBERGER
BY
his AGENT Patented Oct. 2, 1951

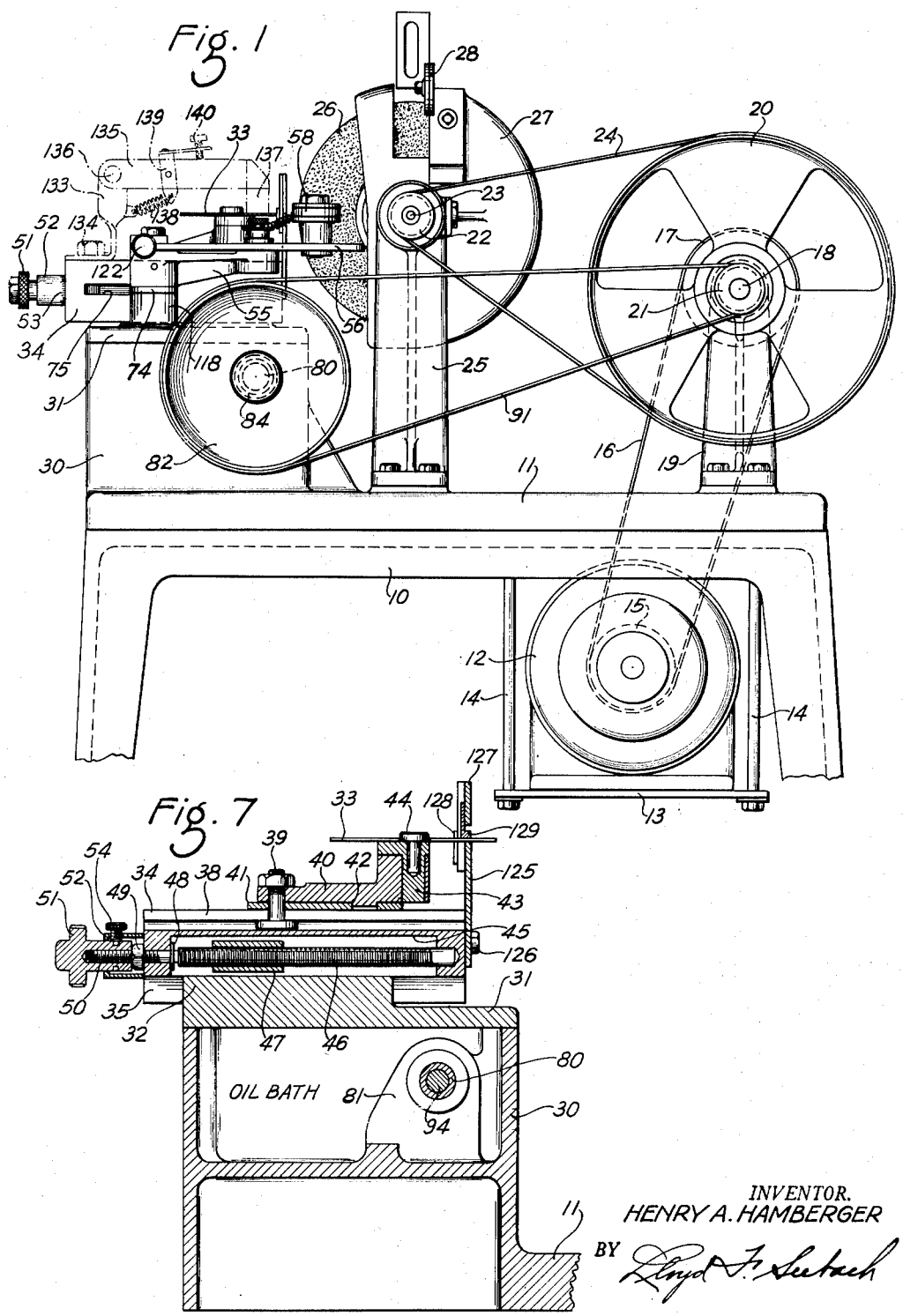

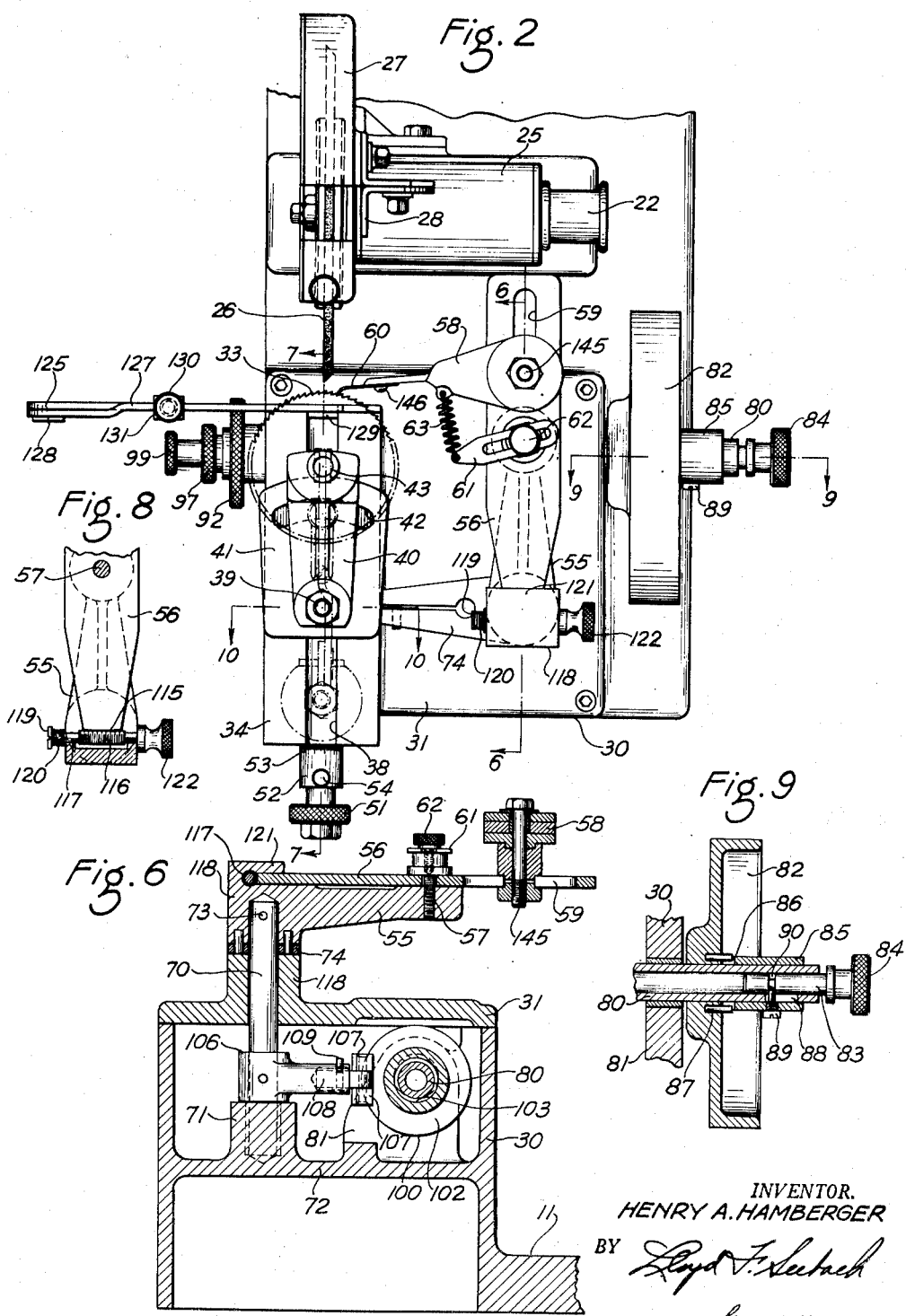

2,570,118

UNITED STATES PATENT OFFICE 2,570,118

AUTOMATIC GRINDER FOR SMALL CIRCULAR SAWS

Henry Anton Hamberger, Rochester, N. Y.

Application December 14, 1948, Serial No. 65,156

8 Claims. (Cl. 76—43)

This invention relates to grinding machines and more particularly to a grinding machine for automatically sharpening the teeth of small circular metal cutting saws.

It is well known in the art to provide an automatic means for sharpening saw teeth. However, small circular saws which are used for cutting metal, because of their large number of teeth, are extremely difficult to sharpen. Since these saws range in size from about three inches in diameter down to about three-quarters of an inch in diameter and may have as many as 150 teeth around the periphery, it is exceedingly difficult to sharpen these saws. It is common practice in machine shops to discard these saws when they become dull because it is impossible to sharpen them or to send them back to the manufacturer who, when a sufficient number of the same type of saws have accumulated, sharpens them by stacking and grinding a number of them at the same time. This practice involves maintaining a large supply of saws on hand because of the time required by the manufacturer to obtain a sufficient number of the same type of saws before grinding them.

The present invention overcomes the above difficulties by providing a fully automatic grinder which is provided with various adjustments to accommodate the machine to any one of the many types of small circular saws and to the many various sizes. The present invention also provides an indexing means which is particularly adapted for saws having a large difference in the number of teeth per peripheral inch. Further, the invention permits the grinding of individual saws and is readily adapted to any diameter saw having any number of teeth. The invention provides a relatively inexpensive and efficient way of maintaining the small circular saws of a machine shop in a sharp and good working condition.

The primary object of the present invention, therefore, is the provision of an automatic grinding machine which is readily adapted to the grinding and sharpening of the teeth of various sizes of small circular metal cutting saws.

Another object of the invention is to provide an automatic grinder for circular saws with a plurality of adjustments for accommodating the wide range of saw sizes to said grinder.

Yet another object of the invention is to provide an adjustment for varying the position of the reciprocating work holder with respect to the grinding wheel for accommodating various saw diameters.

Still another object of the invention is to provide an adjustment on the indexing means whereby the indexing means can be adjusted to accommodate a wide variety of saws having different numbers of teeth per inch.

A still further object of the invention is to provide means for varying the stroke of the reciprocating work holder and the oscillating motion of the indexing means in accordance with the saw being sharpened.

And a still further object of the invention is to provide means for adjusting the work holder and the indexing means independent of the driving means for the work holder and indexing means.

Other objects and advantages of the invention will be apparent to those skilled in the art from the description which follows.

The above objects of the invention are embodied in a machine for grinding circular saw teeth and comprises a grinding wheel, a driving means for imparting rotation to said grinding wheel, a support means for maintaining the saw in a plane perpendicular to the plane of the grinding wheel, an indexing means adapted to engage the teeth of said saw, a rotatable means including an arm connected to said support means and a second arm for supporting said indexing means, a tubular shaft connected to and rotatable by said driving means, an actuating means pivotally mounted on said shaft and connected to said rotatable means for oscillating said rotatable means through an angle determined by said actuating means for imparting a reciprocating motion to said support means for moving said saw into and out of engagement with said grinding wheel and an oscillating motion to said indexing means for intermittently rotating said saw upon movement of said saw away from said grinding wheel, a member movable within said shaft and connected to said actuating means, a clutch means between said driving means and said shaft to permit operation and adjustment of said actuating means independent of said driving means, and means for adjusting said member and said actuating means for varying the angular oscillation of said rotatable means.

Reference is now made to the accompanying drawings in which similar reference characters designate similar parts and wherein:

Fig. 1 is a side elevation of the automatic saw grinder showing the relation of the various elements and the arrangement of the driving means;

Fig. 2 is a partial plan view of the operating mechanism of the grinder;

Fig. 3 is a partial end elevation of the operating mechanism;

Fig. 4 is a partial plan view with the mechanism plate or cover removed and showing the actuating means for the support means and the indexing means;

Fig. 5 is a vertical section taken substantially on the line 5—5 of Fig. 3 and showing the means for adjusting the actuating means;

Fig. 6 is a vertical section taken substantially on the line 6—6 of Fig. 2 showing the connection between the actuating means and the rotatable means;

Fig. 7 is a vertical section taken substantially on the line 7—7 of Fig. 2 showing the means for adjusting the support means with respect to the grinding wheel;

Fig. 8 is a partial section showing the means for adjusting the angular position of the indexing means on the supporting arm;

Fig. 9 is a sectional view taken substantially on the line 9—9 of Fig. 2 showing the clutch connection between the driving means and the tubular shaft;

Fig. 10 is a vertical section taken substantially on the line 10—10 of Fig. 2 showing the manner in which the support means is mounted on the mechanism plate; and Fig. 11 is a bottom view of the support means.

In the illustrated embodiment of the invention, a frame 10 supports the bed-plate 11 and the driving means or motor 12. The motor 12 is mounted on the plate 13 which may be adjusted by the rods 14 with respect to the bed-plate 11 and is provided with a pulley 15 which is connected by the belt 16 to the pulley 17 on the drive shaft 18 mounted in the bearing block 19. The drive shaft 18 is also provided with a large pulley 20 and a small pulley 21 on the end of the shaft 18 opposite the pulley 17. The pulley 20 drives the pulley 22 on the grinding wheel shaft 23 by means of the belt 24. The shaft 23 is mounted in the bearing block 25 and the grinding wheel 26 is secured thereto on the end opposite the pulley 22. The grinding wheel is provided with a guard 27 and is provided with an adjustable bracket 28 for the wheel dressing tool.

The bed-plate 11 has integral therewith a mechanism box 30 of the shape best shown in Figs. 4, 6 and 7 which is provided with a cover 31 having ways 32 on one side thereof.

The support means for the saw 33 comprises a block 34 having ways 35 for engaging the ways 32 on the cover 31 and which is adapted to be reciprocated along said ways in a manner to be described hereinafter. A strip 36 is provided on one side of the ways 32 to adjust, by means of the set screws 37, the sliding action of the block 34 on said ways. The block 34 is provided with a T-slot 38 for securing thereto by means of the bolt 39 the work holder 40. A plate 41 is mounted between the block 34 and the holder 40 and is provided with an arcuate slot 42 to permit rotary adjustment of the holder 40 about the bolt 39. The holder 40 is provided with an insert 43 having a blind hole for receiving the pin or arbor 44 whose head diameter corresponds to the diameter of the hole in the saw 33 to be sharpened. The block 34 has a cavity 45 containing a threaded rod 46 and a nut 47 of the shape best shown in Fig. 11. The rod 46 is retained in position by a lock washer 48 and a nut 49 engaging the threaded portion 50 extending through the block 34. The knob 51 is threaded onto the portion 50 and secured thereto, and since the portion 50 and the end of rod 46 are free to rotate in the block 34 but fixed against axial movement by the washer 48 and the nut 49, rotation of the knob 51 will move the nut axially for purposes to be described hereinafter. A sleeve 52 having graduations 53, see Fig. 2, is held in position by the thumb screw 54 which when backed off allows the sleeve to be moved axially to permit access to the nut 49.

The indexing means comprises an arm 55 on which a plate 56 is pivotally mounted by the bolt 57 and the indexing arm 58 adjustably mounted in the slot 59 in the plate 56. The arm 58 is provided with an indexing finger 60 which is adapted to engage the teeth of the saw and to intermittently advance the saw tooth by tooth. A slotted plate 61 is clamped in an adjusted position by the thumb screw 62 on the bolt 57, and a spring 63 connects the arm 58 and the plate 61 to insure positive engagement of the finger 60 with the teeth of the saw. It can be readily appreciated from an inspection of Figs. 2 and 6 that by loosening the bolt 57, the indexing arm 58 may be moved along the slot 59 to adjust said arm with respect to the saw teeth.

The rotatable means comprises a vertical rod 70 having one end journaled in the boss 71 on the partition 72 in the mechanism box 30 and the other end journaled in the cover 31, the arm 55 to which the upper end is fixed by the pin 73, and the arm 74 pinned to the arm 55 and movable therewith. It will be noted from Fig. 11 that the nut 47 is U-shaped and engages one side of the cavity 45, the legs of said nut extending into the slot 75 in the block 34. This structure prevents any rotation of the nut 46 and provides a receptacle for the arcuate end 76 of the arm 74. It will also be noted from Fig. 2 that the arms 55 and 74 are substantially perpendicular to each other. With the arms 55 secured to the rod 70 by the pin 73 and the arm 74 pinned to the arm 55, it can be readily appreciated that partial rotation of the rod 70 will reciprocate the block 34 on the ways 32 and the index arm 58 will be oscillated to move the finger 60 into and out of engagement with the teeth of the saw 33.

A tubular shaft 80 is journaled in the bosses 81 on the box 30 and has loosely mounted thereon the pulley 82. One end of the shaft 80, see Fig. 9, has a rod 83 with a knob portion 84 slidably mounted in said shaft and a sleeve 85 provided with a clutch face 86 for engaging a plurality of pins 87 on the pulley 82. The shaft has a slot 88 for permitting the end of the screw 89 to engage the peripheral slot 90 in the rod 83. The pulley 82 is connected to the pulley 21 by the belt 91 for rotating the shaft 80. By pulling the knob 84 outwardly, the sleeve 85 is moved therewith and the clutch face 86 is disengaged from the pins 87 to allow the pulley 82 to rotate freely on the shaft 80.

The other end of the shaft 80, see Fig. 5, has mounted thereon a large knob 92 which is secured to said shaft by the U-shaped pin 93. A member 94 is slidably contained in the shaft 80 and has a slot 95 in one end thereof and a reduced threaded portion 96 integral with the other end. A second knob 97 is threaded centrally to engage the portion 96 and has a shoulder abutting the knob 92 and a sleeve portion 98 extending into the shaft 80. The pin 93 is positioned in such a manner as to engage the portion 98 to permit rotation of the knob 97 without axial movement. A lock nut 99 also engages the portion 96 for a purpose described hereinafter.

The actuating means comprises a flanged member 100 which is pivotally mounted on the shaft 80 by the pin 101. It will be noted from Fig. 5, that the member 100 is provided with an annular groove 102 and an enlarged aperture 103 to permit pivoting said member about the pin 101. The member 100 has a pair of ears 104 and the link 105 pivotally connects said ears to the slot 95 in the member 94, said link passing through the slot 80' in the shaft 80. The actuating means or member 100 is operatively connected to the rotatable means or the rod 70 by an arm 106 pinned to said rod and having a pair of shoes 107 adapted to engage the groove 102. The shoes 107 are pivotally mounted on each side of the stub extension 108 carried by the arm 106. The stub extension 108 is fixed in the arm 106 by the pin 109 which engages the slot 110 therein to permit rotation of said stub extension 108.

With particular reference to Figs. 4 and 5, it will be noted that when the nut 99 is backed away from the knob 97, the knob 97 may be rotated to move the member 94 axially to the left. Since the member 94 is connected by the link 105 to the member 100, the member 100 is pivoted about said pin 101 to be angularly disposed with respect to the shaft 80. Since the shoes 107 are pivotally connected on the extension 108 for rotation in the horizontal plane and the pin 109 permits rotation of said shoes in the vertical plane, the flanged member 100, when tilted at an angle with respect to the shaft 80, will rotate or oscillate the shaft 70. Further, the angle at which the flanged member 100 is tilted by the member 94 and the link 105 will determine the angle through which the vertical rod 70 is oscillated. By releasing the sleeve 85, while the pulley 82 is being rotated, the actuating means or flanged member 100 may be rotated manually by the knob 92 to oscillate the rod 70 for moving the block toward and away from the wheel 26 and at the same time rotating the saw 33 by the finger 60 independent of the driving means. Also, the knob 97 may be rotated to vary the angular relation of the member 100 with respect to the shaft 80, thereby varying the angular oscillation of the rod 70 and the movement of the support means and the indexing means. It may be well to point out at this time that the mechanism contained in the box 30 is immersed in an oil bath to insure smooth and quiet operation of the various parts contained therein.

An adjusting means is also provided for moving the indexing means on the arm 55. The plate 56 is provided with an arcuate toothed portion 115 which engages the threaded portion 116 of the rod 117. The rod 117 is journaled in the boss 118 of the arm 55 and is maintained in position by the screw 119 and the spring 120. A lip 121 on the boss 118 provides a bearing for the plate 56. The rod 117 is provided with a knob 122 which when rotated moves the plate 56 about its holding bolt 57 to move the finger 60 toward and away from the teeth of the saw 33. The tension on the finger 60 may be varied by loosening the thumb nut 62 and changing the position of the arm 61.

Since the saw 33 is merely held by the insert 44 which engages the aperture in the saw, it is necessary to provide a means for holding the saw against rotation. For this reason, a U-shaped plate 125 is secured to the front of the block 34 by the screws 126. The end of the plate fixed to the block 34 is in a plane with the top of the insert 43 so that the screw is supported at or near the edge of the saw, see Figs. 3 and 7. A plate 127 is pivotally mounted at 128 to the plate 125 and has a block 129 fixed to the opposite end thereof for engaging the saw. The pressure with which the block 129 clamps the saw is adjustable by the thumb screw 130 which is threaded in the U-shaped bracket 131 and which bears against the plate 127. The bracket 131 is connected by the tension spring 132 to the plate 125. For very small saws, a pressure member, as shown in dotted lines in Fig. 1, comprising a member 133 which is held in the T-slot 38 by the bolt 134, a horizontal bar 135 pivotally mounted on the member 133 at 136, and a saw engaging block 137 fixed to the end of the bar 135 may be substituted for the pressure member above described. The member 133 and the bar 135 are connected by the tension spring 138 fixed to the bracket 139 pivotally mounted on the bar 135 and which is tensioned by the thumb screw 140.

For a complete understanding of the operation and coordination of the various parts the following description recites the proper procedure for making the various adjustments prior to grinding a saw. The proper arbor or pin 44 having a diameter corresponding to the aperture in the saw to be ground is inserted in the insert 43. The knob 84 is moved outwardly to release the sleeve 85 from the pulley 82 which frees the shaft 80 from the driving means. The knob 51 is then turned to move the block 34 to its maximum out position on the ways 32. The nut on the bolt 39 is loosened to move the work holder away from the grinding wheel, and the saw is then placed on the pin 44. The work holder 40 is then slid forward in the slot 38 until the teeth of the saw project beyond the end of the block 34 and the nut is tightened to lock the bolt 39 in the slot 38. The knob 92 is then turned to rotate the member 100 until the block 34 is at the forward end of its reciprocating stroke. The lock nut 99 is then backed off to permit the knob 97 to be rotated for moving the member 94 and tilting the flanged member 100, see Fig. 5, to vary the stroke of the block 34 with respect to the saw. The bolt 145 is then loosened and the indexing arm 58 is adjusted along the slot 59 so that the finger 60 travels back and forth along the teeth of the saw a distance less than two teeth. The finger 60 may also be adjusted along the arm 58 by the screw 146, so that the finger 60 is in line with the center of the wheel when the arm 55 is at the left side of its stroke. Once the proper stroke has been established, the lock nut 99 is turned forward to lock the knob 97 against rotation. The arm 61 may then be adjusted to give the proper spring tension for providing intimate contact of the finger 60 with the saw teeth. A final adjustment of the indexing means may be made by turning the knob 122 to pivot the arm 58 either toward or away from the saw to obtain the best indexing action. The knob 84 is then moved inwardly and the shaft 80 is coupled to the pulley 82 for driving the entire mechanism. The saw is then advanced into the wheel 26 by the knob 51 to get the desired cutting action.

The motor 12 drives the shaft 18 and by means of the belts 24 and 91 the shafts 23 and 80, respectively, are driven. Since the member 100 has been tilted at an angle to give the required stroke, the wobble motion of said member is transmitted to the rod 70 by the arm 106. The shoes 107 which engage the annular groove 102 are oscillated about the pin connecting them to the extension 108, and the extension 108 is oscillated in the arm 106, being retained in position by the pin 109 in the slot 110. As the rod 70 is oscillated, the motion thereof is transmitted by means of the arms 55 and 74 to the indexing arm 58 and the work holder 34, respectively. The work holder 34 is reciprocated along the way 32 on the cover 31 and the finger 60 is moved into and out of engagement with the teeth of the saw. Since the arms 55 and 74 are substantially perpendicular to each other, it can be readily appreciated that as the block 34 and the saw thereon are moved toward the grinding wheel 26, the arms 55, 58 and the finger 60 are moved away from the saw and the finger 60 engages the next tooth. When the block 34 and the saw are moved away from the grinding wheel, the arm 58 and finger 60 are moved toward the grinding wheel 26 to advance the next tooth into position for sharpening.

It may be well to point out that the work holder 40 by loosening the nut 39 may be arranged angularly with respect to the block 34 to accommodate a saw having teeth with an included angle different from that of most saws.

By providing the various adjustments described, it can be readily understood that a large number of saws having different central apertures, different outside diameters, different shaped teeth, and a different number of teeth per peripheral inch can be accommodated by this machine. It is also to be understood that the above described adjustments are made only when different types and diameters of saws are sharpened. When more than one or a large number of the same kind of saws are to be sharpened, the clutch is disengaged, the knob 92 is rotated to move the block 34 to the end of its outer stroke, the sharpened saw is removed from the pin 44, and the next saw placed on said pin. In other words the adjustments must be made only once for the same type of saw.

Since other modifications of the invention are possible, the scope of the invention is not to be limited to the illustrated embodiment but is defined by the appended claims.

Having now particularly described my invention, what I desire to secure by Letters Patent of the United States, and what I claim is:

1. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, an indexing means adapted to engage the teeth of said saw, a rotatable means including an arm operatively connected to said support means and a second arm for supporting said indexing means, said arms being arranged substantially perpendicular to each other and an actuating means including a rotatable shaft operatively connected to said drive means, a member pivotally mounted on said shaft and adjustably inclined at an angle thereto, and a member operatively connected to said first mentioned member and to said rotatable means for oscillating said arms through equal angles as determined by the angular relation of said first-mentioned member with respect to said shaft for simultaneously imparting a reciprocating motion to said support means for moving said saw into and out of engagement with said grinding wheel and an oscillating motion to said indexing means for intermittently rotating said saw.

2. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, an indexing means adapted to engage the teeth of said saw, a rotatable means including an arm operatively connected to said support means and a second arm for supporting said indexing means, said arms being arranged substantially perpendicular to each other, an actuating means including a rotatable shaft operatively connected to said drive means, a member pivotally mounted on said shaft and inclined at an angle thereto, and a member operatively connected to said first-mentioned member and to said arms for oscillating said rotatable means through equal angles as determined by said first-mentioned member for simultaneously imparting a reciprocating motion to said support means for moving said saw into and out of engagement with said grinding wheel and an oscillating motion to said indexing means for intermittently rotating said saw upon movement of said saw away from said grinding wheel, and a sleeve movable axially of said shaft and pivotally connected to said first-mentioned member for varying the angular relation thereof with respect to said shaft.

3. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, an indexing means adapted to engage the teeth of said saw, a rotatable means including an arm operatively connected to said support means and a second arm for supporting said indexing means, said arms being arranged substantially perpendicular to each other, a shaft operatively connected to said drive means and rotatable thereby, an actuating means pivotally mounted on said shaft and operatively connected to said rotatable means for oscillating said arms through equal angles as determined by said actuating means for simultaneously imparting a reciprocating motion to said support means for moving said saw into and out of engagement with said grinding wheel and an oscillating motion to said indexing means for intermittently rotating said saw upon movement of said saw away from said grinding wheel, and a member movable axially of said shaft and pivotally connected to said actuating means for varying the angular relation of said actuating means to said shaft and thereby varying the angular oscillation of said rotatable means.

4. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, an indexing means adapted to engage the teeth of said saw, a rotatable means including an arm operatively connected to said support means and a second arm for supporting said indexing means, said arms being arranged substantially perpendicular to each other, a hollow shaft operatively connected to said drive means and rotatable thereby, an actuating means pivotally mounted on said shaft and operatively connected to said rotatable means for oscillating said arms through equal angles as determined by said actuating means for simultaneously imparting a reciprocating motion to said support means for moving said saw into and out of engagement with said grinding wheel and an oscillating motion to said indexing means for intermittently rotating said saw upon movement of said saw away from said grinding wheel, a member movable within said hollow shaft and operatively connected to said actuating means for varying the angular relation of said actuating means with respect to said shaft and thereby varying the angular oscillation of said rotatable means, and clutch means between said driving means and said shaft to permit movement of said member independently of said driving means.

5. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, an indexing means adapted to engage the teeth of said saw, a rotatable means including an arm operatively connected to said support means and a second arm for supporting said indexing means, said arms being arranged subsbtantially perpendicular to each other, a tubular shaft operatively connected to said driving means and rotatable thereby, an actuating means pivotally mounted on said shaft and operatively connected to said rotatable means for oscillating said arms through equal angles as determined thereby for simultaneously imparting a reciprocating motion to said support means for moving said saw into and out of engagement with said grinding wheel and an oscillating motion to said indexing means for intermittently rotating said saw upon movement of said saw away from said grinding wheel, a member movable within said shaft and operatively connected to said actuating means, and means for moving said member along said shaft with respect to said actuating means for varying the angular position of said actuating means on said shaft and thereby varying the angular oscillation of said rotatable means.

6. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, an indexing means adapted to engage the teeth of said saw, a rotatable means including an arm operatively connected to said support means and a second arm for supporting said indexing means, said arms being arranged substantially perpendicular to each other, a tubular shaft operatively connected to said driving means and rotatable thereby, an actuating means pivotally mounted on said shaft and operatively connected to said rotatable means for oscillating said arms through equal angles as determined by said actuating means for simultaneously imparting a reciprocating motion of said support means for moving said saw into and out of engagement with said grinding wheel and an oscillating motion to said indexing means for intermittently rotating said saw upon movement of said saw away from said grinding wheel, a member movable within said shaft and operatively connected to said actuating means, a clutch means between said driving means and said shaft to permit operation of said actuating means independent of said driving means, and means for moving said member with respect to said actuating means for varying the angular position of said actuating means on said shaft and thereby varying the angular oscillation of said rotatable means.

7. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, a rotatable means including an arm extending therefrom a support member pivotally mounted on said arm, an indexing means adjustably mounted on said support member for engaging the teeth of said saw, means on said arm operatively connected to said support member for varying the angular position of said support member on said arm and the relation of said indexing means to said saw teeth, a tubular shaft operatively connected to said drive means and rotatable thereby, an actuating means pivotally mounted on said shaft and operatively connected to said rotatable means for oscillating said rotatable means through an angle determined thereby for imparting an oscillating motion to said indexing means for moving said saw into and out of engagement with said grinding wheel, a member movable within said shaft and operatively connected to said actuating means for varying the angular relation of said actuating means to said shaft and for varying the angular oscillation of said rotatable means, and clutch means between said driving means and said shaft to permit movement of said shaft independent of said driving means.

8. In a machine for grinding circular saw teeth, the combination comprising a grinding wheel, a driving means operatively connected to said grinding wheel and for imparting rotation thereto, a support means for maintaining said saw in a plane perpendicular to the plane of said grinding wheel, a rotatable means including an arm extending therefrom, a support member pivotally mounted on said arm, an indexing means adjustably mounted on said support member for engaging the teeth of said saw, means on said arm operatively connected to said support member for varying the angular position of said support member on said arm and the relation of said indexing means to said saw teeth, a hollow shaft operatively connected to said drive means and rotatable thereby, an actuating means pivotally mounted on said shaft and operatively connected to said rotatable means for oscillating said rotatable means through an angle determined by said actuating means for imparting an oscillation motion to said indexing means for moving said saw into and out of engagement with said grinding wheel, a member movable within said shaft and operatively connected to said actuating means for adjusting the angular relation of said actuating means to said shaft for varying the oscillation of said rotatable means, and clutch means between said driving means and said shaft to permit movement of said member along said shaft independent of said driving means.

HENRY ANTON HAMBERGER.

REFERENCES CITED

The following references are of record in the file of this patent:

FOREIGN PATENTS

| Number | Country | Date |
|---|---|---|
| 301,478 | France | of 1903 |
| 509,360 | France | Mar. 8, 1920 |